United States Patent [19]

Denton et al.

[11] Patent Number: 5,716,437
[45] Date of Patent: Feb. 10, 1998

[54] MATERIALS FOR USE IN ELECTRODE MANUFACTURE

[75] Inventors: Jan Denton, Reading; John M Gascoyne, High Wycombe; David Thompsett, Reading, all of Great Britain

[73] Assignee: Johnson Matthey Public Limited Company, London, England

[21] Appl. No.: 613,387

[22] Filed: Mar. 7, 1996

[30] Foreign Application Priority Data

Mar. 9, 1995 [GB] United Kingdom ............... 9504713

[51] Int. Cl.$^6$ ................................................ C09D 11/00
[52] U.S. Cl. ................. 106/31.92; 252/514; 204/282; 204/283; 204/286; 204/290 R; 204/291; 204/292; 204/295; 429/40; 429/42; 429/44; 429/45
[58] Field of Search .................. 106/20 B, 31.92; 252/514; 204/282, 283, 286, 290 R, 291, 292, 295; 429/40, 42, 44, 45

[56] References Cited

U.S. PATENT DOCUMENTS

| | | | |
|---|---|---|---|
| 5,211,984 | 5/1993 | Wilson | 427/115 |
| 5,346,780 | 9/1994 | Suzuki | 429/42 |
| 5,501,915 | 3/1996 | Hards et al. | 429/42 |
| 5,523,177 | 6/1996 | Kosek et al. | 429/40 |

FOREIGN PATENT DOCUMENTS

| | | |
|---|---|---|
| 0 026 979A2 | 4/1981 | European Pat. Off. |
| 0 064 389A1 | 11/1982 | European Pat. Off. |
| 0 305 565 | 3/1989 | European Pat. Off. |
| 0 309 337 | 3/1989 | European Pat. Off. |
| 0 569 062A2 | 11/1993 | European Pat. Off. |
| 0 622 861A1 | 11/1994 | European Pat. Off. |
| 1 286 859 | 8/1972 | United Kingdom. |
| WO 94/25993 | 11/1994 | WIPO. |

OTHER PUBLICATIONS

Ian D. Raistrick, "Modified Gas Diffusion Electrodes for Proton Exchange Membrane Fuel Cells", Extended Abstracts, vol. 86–1, May 4–9, 1986, p. 660.

Patent Abstracts of Japan, JP 58147575 published Feb. 9, 1983.

*Primary Examiner*—Bruce F. Bell
*Attorney, Agent, or Firm*—Cushman Darby & Cushman IP Group Pillsbury Madison & Sutro LLP

[57] ABSTRACT

An improved ink material, particularly for use in printing processes and its use in improved manufacturing processes for higher performance electrodes for application in fuel cells and other electrochemical devices is disclosed.

17 Claims, 5 Drawing Sheets

MATERIALS FOR USE IN ELECTRODE MANUFACTURE

BACKGROUND OF THE INVENTION

(1) Field of the Invention

The present invention relates to an improved ink material and in particular to its use in improved manufacturing processes for higher performance electrodes for application in fuel cells and other electrochemical devices.

(2) Description of the Prior Art

A fuel cell cleanly, quietly and efficiently converts the stored chemical energy of its fuel into electrical energy by combining a fuel such as hydrogen, stored either as a gas or a liquid or produced by using a reformer, with an oxidant such as oxygen. Liquid hydrocarbon fuels, such as methanol can also be used at the anode. The hydrogen and oxygen are respectively oxidised at the anode or reduced at the cathode. An electrolyte is required which is in contact with both electrodes, which may be alkaline or acidic, liquid or solid. The liquid electrolyte phosphoric acid fuel cell (PAFC) operating at a temperature of 190°–210° C., is a type of fuel cell close to commercialisation and will find applications as combined heat and power, ie co-generation systems, in the 50 to several hundred kilowatt range and also in the multi-megawatt utility power generation market. In solid polymer fuel cells (SPFCs) or proton exchange membrane fuel cells (PEMFCs), the electrolyte is a solid proton-conducting polymer membrane, commonly based on perfluorosulphonic acid materials. The electrolyte must be maintained in a hydrated form during operation in order to prevent loss of ionic conduction through the electrolyte. This limits the operating temperature of the PEMFC typically to between 70° C. and 120° C. dependent on the operating pressure. The PEMFC does, however, provide much higher power density output than the PAFC, and can operate efficiently at much lower temperatures. Because of this it is envisaged that the PEMFC will find use in vehicular power generation and small scale residential power generation applications. In particular, zero emission regulations have been passed in areas of the United States which are likely to restrict the use of combustion engines in the future. Pre-commercial PEMFC-powered buses and prototype PEMFC-powered vehicles are now being demonstrated for these applications.

Due to these relatively low temperatures, the oxidation and reduction reactions require the use of catalysts in order to proceed at useful rates. Precious metals, particularly platinum, have been found to be the most efficient and stable catalysts for all low temperature fuel cells operating below 300° C., and are particularly useful in acid electrolyte fuel cells such as the PAFC and PEMFC. The platinum catalyst is provided as very small particles (~20–50 Å), of high surface area, which are often, but not always, distributed on and supported by larger microscopic conducting carbon particles to provide a desired catalytic loading. Conducting carbons are the preferred materials to support the catalyst due to their corrosion resistance to acidic electrolytes. The electrodes are formed from this catalytic material and should be designed to optimise contact between the reactant gas (ie oxygen or hydrogen), the electrolyte and the precious metal catalyst. The electrode should be porous, and is often known as a gas diffusion (or gas porous) electrode, in order to allow the reactant gas to enter the electrode from the face of the electrode exposed to the reactant gas stream (back face), the electrolyte to penetrate through the face of the electrode exposed to the electrolyte (front face) and products, particularly water, to diffuse out of the electrode. Efficient porous gas diffusion electrodes, using platinum catalysts supported on conducting carbon materials, at platinum loadings of 0.2–0.5 mg/cm$^2$ of electrode area, have been developed for fuel cells using liquid electrolytes such as the PAFC.

Gas diffusion electrodes are employed in many different electrochemical-based technologies in addition to fuel cells. These include metal-air batteries, electrochemical sensors and electrosynthesis applications. In practice, these gas diffusion electrodes comprise in addition to the catalyst material, other noncatalytic components, such as polymeric binders, the various components together forming one or more layers, and supported on a porous conducting substrate material, for example, conducting carbon materials (papers, cloths, foams) or, particularly in the case of non-acid fuel cells, metal meshes of nickel or steel grids, or in the case of sensors, various forms of porous polytetrafluoroethylene (PTFE) sheet.

To date, a wide range of processes have been used to produce gas diffusion electrodes, including filtration, powder vacuum deposition, spray deposition, electrodeposition, casting, extrusion, rolling and printing.

Fuel cells, such as the PAFC and PEMFC, employ gas diffusion electrodes with a range of formulations. For fuel cells using liquid electrolytes such as the PAFC, efficient porous gas diffusion electrodes, using platinum catalysts supported on conducting carbon materials, at platinum loadings of 0.2–0.5 mg/cm$^2$ of electrode area, have been developed. The catalyst is typically mixed with additions of PTFE which acts as a binder and also provides a desired level of hydrophobicity, and the electrode is formed by applying the catalyst-containing material to one side of a supported carbon fibre paper-based substrate. The liquid electrolyte can penetrate the portion of the porous structure of the catalysed carbon support which contains most of the platinum catalyst, and in practice above 90% of the available catalyst surface is effectively available to participate in the oxidation and reduction reactions.

In the PEMFC, each electrode is bonded to the sold polymer electrolyte which is in the form of a thin membrane, to form a single integral unit, known as the membrane electrode assembly (MEA). It has been found that the supported catalysed gas diffusion electrodes developed for the PAFC, are in general unsuitable for use with PEMFCs since only very low current densities are usually attainable. Realising the high current densities that are potentially available requires that a considerable proportion of the catalyst surface is in contact with the electrolyte and the reactant gas. When the solid polymer electrolyte is bonded to the electrode a three-phase interface, ie where the membrane electrolyte is in direct contact with the electrocatalyst surface and an adjacent gas pore, only readily occurs at the front surface of the electrode and only a fraction of the electrocatalyst in the electrode is used to perform the desired reactions as the electrolyte typically does not penetrate into the depth of the electrode. State of the art PEMFCs therefore utilise electrodes containing unsupported platinum black with relatively high precious metal loadings, typically 4 mg/cm$^2$ per electrode, in order to maximise the level of platinum contact at the front face of the electrode.

At these high levels of platinum catalyst it is unlikely that the PEMFC could be made at a low enough cost for certain applications such as small light-duty vehicles. It is therefore necessary to produce an electrode with much lower loadings of platinum, for example, below 0.5 mg/cm$^2$. It is thus imperative to maximise the utilisation of the available surface area of the catalysts at these lower loadings. For this reason, it is necessary both to employ catalysts which are supported on carbon particles, in order to maximise the intrinsic surface area for the catalytically active material per unit weight of the material, and to produce an electrode in which the solid polymer electrolyte is able to penetrate the electrode to a greater depth to maximise the extent of contact with the active surface of the catalyst material.

The most common form of a solid polymer electrolyte material is a perfluorinated sulphonic acid co-polymer marketed by E I duPont under the trade name Nafion®. In order to be able to use lower loadings of precious metal catalyst on the electrodes of the PEMFC, it has become common practice to combine the catalyst material with soluble forms of the solid polymer electrolyte material. In this way the extent of the interface can be increased into the depth of the gas diffusion electrode, and more of the active catalyst can be made available for reaction. Several recent disclosures in the literature describe methods of forming the catalyst/polymer electrolyte interface from soluble forms of the polymer electrolyte material.

U.S. Pat. No. 4,876,115 (United States Department of Energy) discloses a method of fabricating a gas diffusion electrode by first forming the electrode from a carbon-supported platinum-containing catalyst and a polymeric binder such as polytetrafluoroethylene (PTFE) deposited onto an electrically conducting substrate, and then applying a coating of soluble Nafion to the electrolyte (front) surface of the electrode, either by spraying or painting. The soluble Nafion as commercially available from, for example, Solution Technology Inc of Medenhall, Pa., U.S.A., is contained typically as a 5 wt % solution in an essentially organic solvent of lower aliphatic alcohols (principally propan-1-ol and propan-2-ol) with approximately 18% water. The electrode, after coating with the solution of Nafion requires treatment (e.g. heating) to remove the organic solvent. WO 92/15121 (United States Department of Energy) and U.S. Pat. No. 5,211,984 (the Regents of the University of California) disclose a method of depositing inks comprising mixtures of carbon-supported platinum catalyst and solubilised Nafion in alcohol-based solvents and further additives based on an organic polyhydric alcohol or polyol (glycerol), directly onto the membrane electrolyte film to form part of the MEA.

In addition to the requirement to produce electrodes for the PEMFC with high performance and low loadings of precious metal catalyst, a further and more significant challenge which is critical for the development of economically viable fuel cell technology of all types, but more particularly for application of the PEMFC in transportation, is that the electrodes have to be capable of being manufactured in high volumes at very low unit (per electrode) cost. The state of the art methods for electrode fabrication for all types of gas diffusion electrodes employed in fuel cells and indeed other applications are not amenable to very high volume production at low costs. This has been a major contributory reason why electrochemical technology employing gas diffusion electrode materials has to date only seen limited commercialisation, in specific niche applications.

With respect to the PEMFC, the solutions of the electrolyte material (Nafion) used in the above two methods contain a high percentage of volatile organic solvents, and these solvents can present several problems. A major disadvantage with using organic-based solutions of the electrolyte material is that organic solvents are volatile and toxic, and a manufacturing process which uses such solutions of the electrolyte material requires safety measures to be taken which add considerably to the manufacturing costs. A further disadvantage with using organic-based solutions of the electrolyte material, is that when in contact with the platinum-based catalyst particles, it is possible for combustion of the volatile organic solvents to occur spontaneously at ambient ie room temperatures. A still further disadvantage is when the soluble Nafion is coated onto the surface of the pre-formed gas diffusion electrode, as described in U.S. Pat. No. 4,876,115, it is common practice in the art that this has to be performed at elevated temperatures, eg 50°–100° C., in order to avoid excess and uncontrolled penetration through the thickness of the electrode into the conducting support which, if occurred, would have a deleterious effect on the performance of the MEA. This necessary procedure again adds to the electrode manufacturing costs. This is also a necessary but undesirable process step for application of ink mixtures comprising catalyst and soluble forms of the polymer electrolyte based on organic solvents, such as those described in WO 92/15121 and U.S. Pat. No. 5,211,984, if applied to the conducting substrate support. A still further disadvantage of these inks, is that, as is described in U.S. Pat. No. 5,211,984, if applied directly to the membrane surface, distortion of the membrane can occur due to the effect of solvents in the ink on the membrane. This can cause deleterious effects on the mechanical integrity of the catalyst layer bonded to the membrane, and as such lead to a decay in the performance of the MEA and consequently the fuel cell. A yet further disadvantage of these inks is that in the presence of catalyst some oxidation of the organic solvents and also the polyol components may occur to form products which may not be removed from the electrode or MEA in the final drying stage. The continuing presence of these products in the electrode may have a deleterious effect on the long term performance of the MEA. These state of the art inks may therefore have a short shelf life, which will again have implications on the manufacturing of the electrodes.

The proportion of organic solvents or other additives which are added, typically to modify the viscosity of the ink, in prior art examples of methods to produce high performance, low catalyst loading electrodes and MEAs for the PEMFC, is very high. These ink formulations are not amenable to low cost, large scale manufacturing processes for the reasons described above.

The method as described in U.S. Pat. No. 4,876,115 involves applying a coating of soluble Nafion polymer to the electrode surface, either by spraying or by using an applicator onto the surface. The common practice in the art, as described by, for example, S. Mukerjee and S. Srinivasan in J Ecletroanal Chem, 357 (1993), 201–224, is that the coating solution, which comprises 5 wt % of the polymer in an organic solution of principally (>80 wt %) lower aliphatic alcohols, is applied using a brushing technique. The inks used to directly coat membrane surfaces, as described in U.S. Pat. No. 5,211,984, comprise the carbon-supported platinum-based catalyst material mixed with the 5 wt % solution of the Nafion polymer in the organic aliphatic alcohols, to which is added further quantities of water and the organic polyhydric alcohol, glycerol. Over 70 wt % of the resulting ink is comprised of the organic alcohol components.

A further ink formulation, comprising catalyst and a soluble form of the electrolyte has been considered in WO 94/25993 (E I duPont de Nemours and Company). This discloses a method for making the electrode layer from the catalyst-containing ink. The ink comprises catalytically active particles, dispersed in an organic alcohol-based liquid medium, particularly preferred is 1-methoxy 2-propanol, and a polymer component such as the Nafion perfluorinated sulphonic acid in a solution of lower aliphatic alcohols or a perfluorinated sulphonyl fluoride in an organic hydrocarbon solvent. The document describes an example in which the electrode ink comprises 77.4% by weight of the organic components, 10.3 wt % water, 9.7 wt % catalyst and 2.6 wt % of Nafion polymer.

M. Uchida et al (J Electrochem Soc 142 (2) p 463–468 (1995) describe a fabrication method for membrane electrode assemblies based on the addition of perfluorinated sulphonic acid polymers to a range of organic solvents, based on alcohols, amines, ketones, esters and ethers. When the polymer solution was mixed with various kinds of organic solvents, the mixture changed into one of three states: (i) solution, (ii) colloid, and (iii) precipitate. The polymer solutions which formed colloids were used to prepare a catalyst-containing paste by adding the catalyst material to the polymer solutions and transforming the mixture to a paste by ultrasonic treatment. The electrode layer was then constructed by filtration of the paste onto the conducting carbon fibre paper substrate, followed by hot-pressing. The document reports that all the pastes were made by the addition of catalyst to polymer solutions in which the weight ratio of dry polymer to organic solvent was 1:60.

In U.S. Pat. No. 5,346,780 (Suzuki) a high activity fuel cell electrode is again formed by mixing a carbon-supported platinum catalyst with a solution of a perfluorinated sulphonic acid polymer. The polymer is dissolved to the level of 5 wt % in a mixed solvent consisting of a lower alcohol and water.

None of the above documents provide a solution of catalyst and polymer material which is essentially free from organic solvents or additives. Such a solution would be highly desirable in that it would be less toxic and would overcome problems associated with handling high volumes of organic materials in a manufacturing process.

It is the aim of the present invention to provide an ink material comprising a catalyst component and a polymeric material which is essential from organic components.

SUMMARY OF THE INVENTION

Accordingly, the present invention provides an ink comprising a mixture of one or more catalyst materials and one or more proton-conducting polymers in a liquid medium characterised in that the liquid medium is aqueous-based and essentially free from organic components. The invention overcomes problems associated with prior art inks by providing an ink which does not require removal of organic components once applied to a substrate. Furthermore, during the manufacturing process the hazards associated with organic components, particularly solvents, are removed. Furthermore, the electrodes manufactured from these inks have improved performance over electrodes produced from inks comprising high levels of organic components.

The term "ink" is used to describe the present invention and implies a material that is dispersed in a vehicle carrier and that can be applied to a substrate by a variety of methods, such as filtration vacuum deposition, spray deposition, casting, extrusion, rolling or printing.

The phrase "essentially free from organic solvents" should be interpreted by meaning that small percentages, eg up to 10 wt % of organic components in the liquid medium is acceptable and does not hinder the performance of the invention. Suitably, the percentage of organic solvent in the liquid medium is <5 wt %, more suitably <3 wt %, preferably <1 wt % and most preferably entirely free from any additional organic component. If any organic components are present, suitably they are selected from a relatively non-volatile material such as a polyol or water-soluble cellulose-based material, to act as a viscosity or rheology modifier. The ink may also contain trace quantities (eg <0.1%) of volatile solvents such as lower aliphatic alcohols, the total mount of all organic components in the liquid medium not exceeding 10 wt %.

Suitably the proton-conducting polymeric material is a fluorinated co-polymer with ion exchange groups, preferably a perfluorinated co-polymer with ion exchange groups, for example Nafion.

The term "catalyst" will be well understood by a person skilled in the art by meaning a catalyst that when incorporated into a gas diffusion electrode facilitates an electrochemical reaction, for example the catalyst may be selected from the platinum group metals (ie platinum, palladium, rhodium, ruthenium, iridium and osmium), gold, silver or a base metal or base metal oxide, or an alloy or mixture comprising one or more of these metals, preferably supported on a conductive substrate, such as carbon.

The invention also provides a process for preparing an ink according to the invention, said process comprising mixing the one or more catalysts with the one or more proton-conducting polymers in a liquid medium, which may be aqueous or organic, and thereafter if necessary, the transformation of the organic medium into an essentially aqueous medium. The transformation of the organic medium into an essentially aqueous medium may be carried out by a constant volume displacement distillation process.

The present invention also provides an electrode comprising an ink according to the present invention and a method for preparing such an electrode said method comprising applying the ink to a substrate (eg of carbon paper) by any method known in the art and including filtration vacuum deposition, spray deposition, casting, extrusion, rolling or printing. A further aspect provides a membrane electrode assembly comprising one or more electrodes of the invention. A still further aspect provides a fuel cell comprising an electrode or a membrane electrode assembly of the present invention.

A further aspect of the present invention provides a membrane electrode assembly comprising an ink according to the present invention and a method for preparing such a membrane electrode assembly, said method comprising applying the ink directly onto the surface of the polymer electrolyte membrane by any method known in the art and including filtration vacuum deposition, spray deposition, casting, rolling or printing. A still further aspect provides a fuel cell comprising a membrane electrode assembly of the present invention.

The aqueous based inks of the present invention are particularly suitable for printing and it has been found that the use of such aqueous-based inks for printing can be extended to include inks comprising an catalyst and a polymer material which may or may not be a proton-conducting polymer. The prior art has many examples of the use of printing of mixtures comprising catalyst and polymer material which is non-proton-conducting to produce gas diffusion electrodes. However, as exemplified in, for example, U.S. Pat. No. 4,229,490, the inks are again of very high content of organic based solvents, in this case being 30–40% by weight of a complex organic alcohol, octyl phenoxy polyethoxy ethanol. Examples of such other polymers include organic polymers which act as electrode structural binders and/or controllers of reactant and product flow through the electrode. Examples of such polymers are polytetrafluoroethylene (PTFE), fluorinated ethylenepropylene co-polymer (FEP) and non-fluorinated polymers such as polyethylene or propylene. Accordingly, a further aspect of the present invention provides a printing ink comprising one or more catalysts and one or more polymer materials in a liquid medium characterised in that the liquid medium is aqueous based and comprises less than 10 wt % organic components. It has been found that the addition of small quantities of an organic rheology modifier can improve the dispersion of the catalyst in the aqueous medium when printing the ink onto a substrate.

The invention also provides an electrode comprising a printing ink of the present invention and a method for preparing the same said method comprising applying said printing ink to a suitable substrate (eg carbon fibre paper) by a printing method, for example screen printing or stencil printing. A further aspect of the invention provides an membrane electrode assembly comprising a printing ink according to the present invention and a method for preparing the same, said method comprising applying said printing ink directly onto the surface of a polymer electrolyte membrane by a printing method, for example screen printing or stencil printing. When the electrode is prepared using a printing ink wherein the printing ink comprises one or more catalysts and a polymer material which is not a proton-conducting polymer, an additional layer may be applied onto the electrode (eg by printing), said additional layer comprising a solution of a proton-conducting polymer such as Nafion. The solution of the proton-conducting polymer is preferably aqueous-based and may be prepared from an organic-based solution by a constant volume displacement distillation process. The aqueous-based proton-conducting polymer solution has many advantages over the organic-based versions: it is non-toxic, free from the problems associated with handling of organic solvents in a manufacturing process, and has less tendency to penetrate into the electrode substrate in an uncontrolled manner. Therefore, a yet further aspect of the present invention provides an electrode prepared by printing an ink comprising one or more catalysts and one or more organic polymers which act as structural binders and/or controllers of reactant and product flow onto a substrate (eg carbon fibre paper) followed by applying (eg by printing) a layer of an aqueous solution of a proton-conducting polymer.

DESCRIPTION OF PREFERRED EMBODIMENTS

A major advantage of the present invention is that the whole gas diffusion electrode which can comprise several layers of differing formulations, can be completely manufactured by employing a series of essentially aqueous inks, which can be applied using the same high volume, low cost, production technique, such as printing. The hazards associated with handling volatile organic solvents are eliminated.

Figure 1:
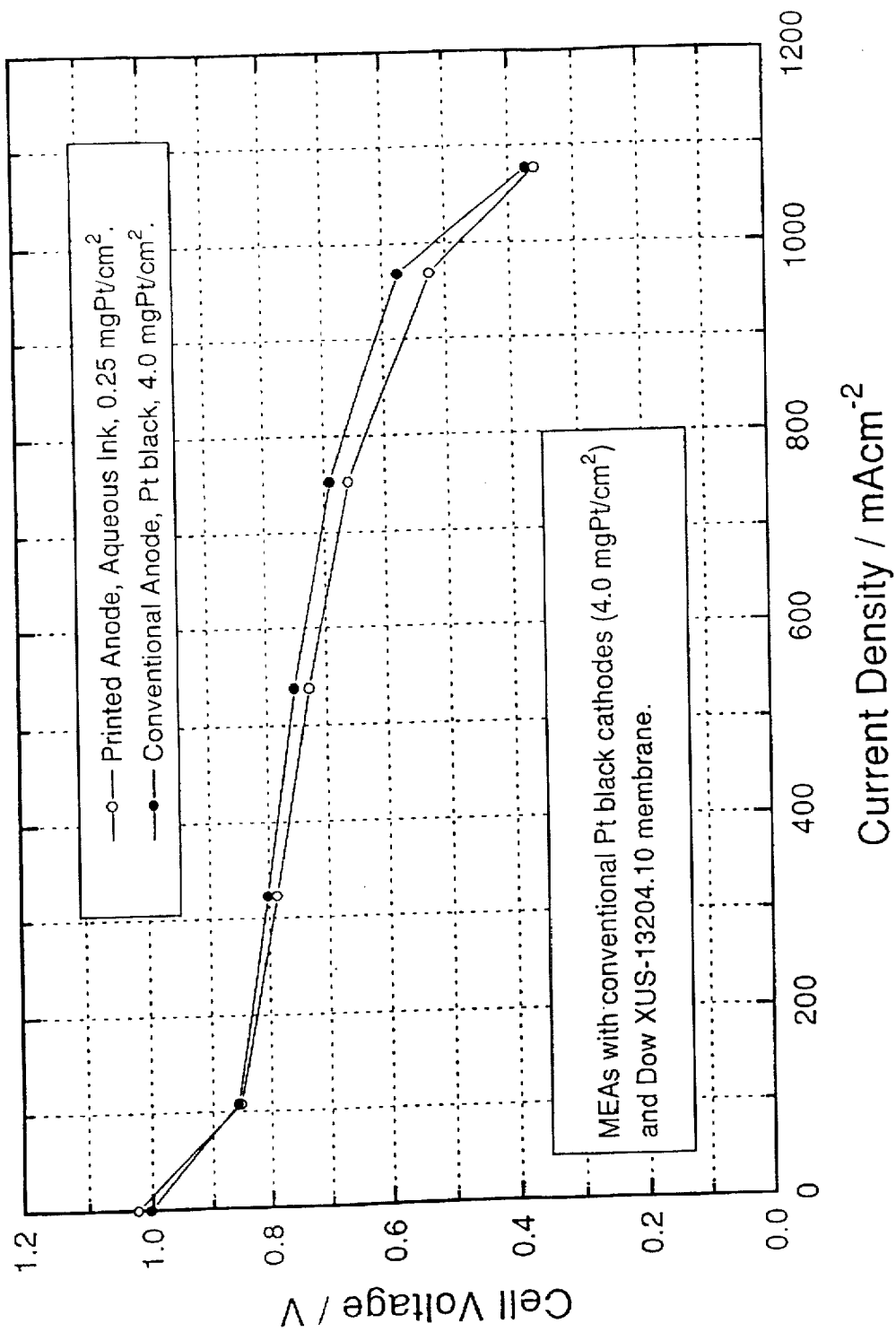
FIGS. 1-5 are graphs illustrative of the advantages of the invention.

The present invention will now be described by way of example only which is not intended to be limiting thereof.

The materials of the invention can be employed as either the anode or cathode, and indeed both anode and cathode in the electrochemical cells of the specific application. In the following examples the electrodes are incorporated in membrane electrode assemblies (MEAs) and evaluated in a proton exchange membrane fuel cell. The MEAs were fabricated by hot pressing the anode and cathode against each face of the solid proton conducting electrolyte membrane. The membranes used were the perfluorinated membranes Nafion® 117 (from Du Pont de Nemours) and Dow XUS-13204.10 (an experimental membrane from Dow Chemical Company). The MEAs were formed by hot pressing at pressures of 400 psi (1 psi=$6.89 \times 10^3$ Nm$^{-2}$) over the MEA, at temperatures exceeding the glass transition temperature of the membrane, as is commonly practised in the art.

The MEAs were evaluated in a PEMFC single cell, produced by Ballard Power Systems of Canada, and referred to as a Mark 5E cell. The single cell consists of graphite plates into which flowfields are machined to distribute reactant gases, humidification water and heating or cooling water and to remove products. The MEA is located between the appropriate flowfield plates. The cell is compressed, typically to a gauge pressure of 70 psig above the reactant gas pressure.

The "performance" of the fuel cell was assessed by measuring the voltage and current density relationship using a standard operating procedure. The fuel cell was operated under conditions representative of those employed in practical PEM fuel cells. Unless otherwise stated, these conditions were typically a reactant gas inlet temperature of 75°–80° C., a pressure of both hydrogen and air reactants of 3 atmospheres, and a reactant stoichiometry for hydrogen of 1.5 and air of 2.0.

In the following Examples the inks of the invention are maunfactured at a pilot plant scale of up to a kilogram batch size, capable of producing many hundreds of electrodes per batch.

EXAMPLE 1

To a carbon supported catalyst (180 g of a 20 wt % platinum, 10 wt % ruthenium catalyst, supported on Cabot Vulcan XC72R, from Johnson Matthey Inc., New Jersey, U.S.A.) was added demineralised water (300 cm$^3$). This was mixed to ensure thorough wetting of the catalyst. To the slurry was added a solubilised form of a perfluorosulphonic acid polymer (1080 g), for example, Nafion EW1100 (as commercially available from Solution Technology Inc. of Mendenhall, Pa., U.S.A., and contained as a 5 wt % solution in an essentially organic solvent of lower aliphatic alcohols with approximately 18% water). The slurry or mixture was shear mixed using a Silverson mixer for 15 minutes to produce a smooth paste. Further demineralised water was added (1,000 cm$^3$) and the mixture then heated to remove the organic solvents. Constant volume was maintained during this stage by the addition of further demineralised water. After removal of all organic solvents the volume was reduced by further heating to a final slurry weight of 1040 g. The mixture was then shear mixed for 20 minutes whilst still hot to produce an ink of the invention, suitable for forming an electrode. Analysis of the ink by gas liquid chromatography showed that the residual organic component in the ink was less than 0.001% by weight of each of n-propanol and iso-propanol constituents. No other organic solvents were detected.

The ink was screen printed through an appropriately selected screen mesh onto a pre-teflonated carbon fibre paper substrate (for example, Toray TGP-090, available from Toray Industries Inc, Tokyo, Japan) to give a platinum loading in the electrode of 0.25 mg cm$^{-2}$ geometric area. The resulting electrode was dried, either at room temperate for 12 hours, or at elevated temperatures, not exceeding 100° C., for shorter periods. The screen printing process is a rapid, high volume coating process, and using an ink of the invention, the capability of printing at rates of up to 10 electrodes per minute was demonstrated. The ink batch of this example was capable of producing over 500 identical electrodes. The resulting electrode formed the anode of an MEA. The cathode was a state of the art electrode, as employed in current PEMFC stacks based on a high platinum loading of 4.0 mg cm$^{-2}$, using an unsupported platinum black catalyst.

By way of making a comparison, the performance was compared with that of a conventional state of the art MEA, typical of those used in current PEMFC stacks, comprising both anode and cathode fabricated with a high platinum loading of 4.0 mg cm$^{-2}$, using an unsupported platinum black catalyst. The comparative anode and cathode were fabricated by a laboratory method, as currently practised in the art, which was not amenable to scale up to a rapid, high volume, and thus low cost, manufacturing process. The performance of the two MEAs are compared in FIG. 1. The current vs voltage curves are similar, indicating that, for example, at a current density of 1,000 mAcm$^{-2}$, the cell voltage of the MEA with the anode of the invention was only 20 mV lower than that of the conventional MEA. This is despite a reduction in platinum loading on the anode of a factor of 16 from 4.0 mg cm$^{-2}$ to 0.25 mg cm$^{-2}$. The result indicates that low catalyst loading anodes can be made by high volume, low cost, manufacturable methods, such as the printing of aqueous based catalyst and Nafion polymer containing inks, to give acceptable cell performance.

EXAMPLE 2

In this embodiment of the invention, the ink was manufactured by first preparing an essentially aqueous form of the proton conducting polymer solution, prior to the mixing with the catalyst to form the ink. To the Nafion EW1100 solution (800 g, as available from Solution Technology Inc of Mendenhall, Pa., U.S.A., and contained as a 5 wt % solution in an essentially organic solvent of lower aliphatic alcohols) was added demineralised water (500 cm$^3$). The mixture was heated, whilst maintaining continuous stirring, at a temperature sufficient to distill off the organic solvent component. A constant volume was maintained by the addition of further demineralised water. After all traces of organic solvents had been removed, the aqueous solution was concentrated by further heating at the boil to produce the desired concentration of Nafion. This was typically in the range of 5–15 wt % Nafion in aqueous solution. Analysis of the solution by gas liquid chromatography showed that the level of residual trace organic solvents in the essentially aqueous solution of the Nafion polymer was less than 0.001% by weight of each of the n-propanol and iso-propanol components originally present in the Nafion solution. No other organic solvents were detected.

A 9.5 wt % aqueous solution of Nafion (316 g) was heated with stirring to a temperature of approximately 60° C. A carbon supported catalyst (100 g of a 40 wt % platinum catalyst, supported on Cabot Vulcan XC72R, from Johnson Matthey Inc, New Jersey, U.S.A.) was added to the Nafion solution whilst maintaining stirring. Once the catalyst was fully wetted, the paste was heated to 100° C. and shear mixed with a Silverson mixer until a smooth ink, suitable for printing, was produced. The ink was cooled to the ambient room temperature.

The ink was screen printed through an appropriately selected screen mesh onto a pre-teflonated Toray TGP-090 carbon fibre paper substrate to give a platinum loading in the electrode of 0.58 mg cm$^{-2}$ geometric area. The resulting electrode was dried as described in Example 1. The resulting electrode formed the cathode of an MEA. For operation of a fuel cell on pure hydrogen fuel, the anode does not have a large effect on cell performance. The major contribution to cell performance losses is due to the performance of the oxygen reduction cathode. Thus it is a more demanding criterion to assess the performance of new electrodes as cathodes. Thus this and further examples concentrate on the performance of the electrodes of the invention when employed as cathodes. The anode was a state of the art electrode, as employed in current PEMFC stacks based on a high platinum loading of 4.0 mg cm$^{-2}$, using an unsupported platinum black catalyst.

By way of making a direct comparison, the performance was compared with that of an MEA in which the cathode was formulated to the same nominal low loading of the same supported platinum catalyst, but was fabricated from an ink comprising volatile organic solvents, typical of that described in the prior art, and was fabricated by conventional laboratory methods. The comparative cathode was fabricated by mixing the catalyst (1.0 g) with a minimum quantity of demineralised water (1.65 cm$^3$), to thoroughly wet the catalyst, and adding Nafion EW1100 solution (2.4 g contained as the 5 wt % solution in an essentially organic solvent of lower aliphatic alcohols), with further mixing. The resultant ink comprised a level of organic solvents of 37% by weight. The ink was painted onto the surface of a pre-teflonated Toray TGP-090 carbon fibre paper substrate to give a platinum loading on the electrode of 0.60 mg cm$^{-2}$ geometric area. The electrode was placed on a hot plate at a temperature of 70°–80° C., during the application of the organic solvent containing catalyst ink. The aim of this was to minimise penetration of the volatile organic solvents and Nafion components through the depth of the electrode structure. The resulting electrode was dried as described in Example 1.

Figure 2:
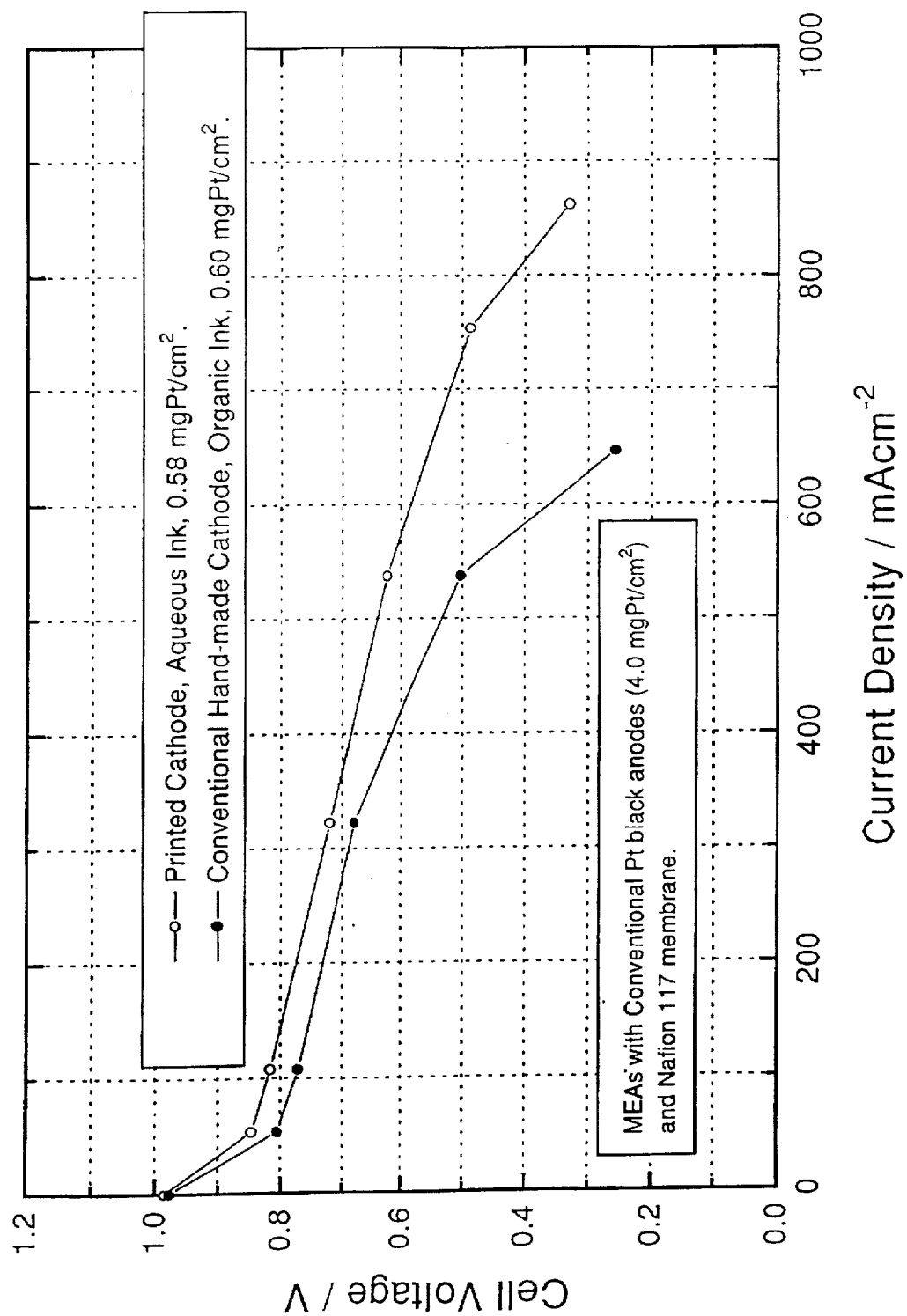

The cell performance characteristics are shown in FIG. 2. It can be seen that there is a more significant difference between the performance of the MEAs due to their use as cathodes. Indeed, it can be seen that in this Example, an electrode of the invention exhibits superior performance to that of a cathode of similar formulation, but fabricated using an ink high in volatile organic solvents. As the current density increases above 500 mA cm$^{-2}$ it can be seen that the voltage of the conventional electrode decreases at a much greater rate. At high current densities the performance is affected by mass transport losses associated with the diffusion of reactant oxygen and protons, and product water through the cathode structure. It is postulated that the use of an ink containing organic solvents which has led to some penetration of the carbon fibre paper substrate with Nafion during the preparation of the electrode. This may results in increased blockage of the structure with product water (flooding) due to the relatively hydrophilic nature of the Nafion polymer component. Not only does aqueous ink provide a more manufacturable electrode process, but improved performance is also demonstrated.

EXAMPLE 3

In this embodiment of the invention the advantage of producing an electrode comprising several layers, by a low cost, volume manufacturable technology, based on essentially aqueous inks suitable for printing, is demonstrated.

A first ink layer was applied to the carbon fibre paper substrate by screen printing an essentially aqueous ink comprising carbon black and PTFE polymer. The ink was screen printed through an appropriately selected screen mesh onto a pre-teflonated Toray TGP-090 carbon fibre paper substrate. The part complete electrode was dried as described in Example 1.

A second ink layer was applied to the carbon layer described above by screen printing an essentially aqueous ink of unsupported platinum black catalyst and PTFE polymer. Demineralised water (800 cm$^3$) was added to platinum black (92.5 g of HSA-Grade from Johnson Matthey, Royston, UK) and was mixed with stirring to thoroughly disperse. PTFE solution was added (12.5 g of ICI GP1 60 wt % solids suspension). The slurry was heated to 75° C. with continuous stirring until the mixture gelled. After cooling this was filtered to remove excess water. To the resulting gel (typically weighing 200 g) was added a solution (100 g as a 2 wt % aqueous solution) of methyl cellulose (from Aldrich Chemical Company, Dorset, UK). The mixture was shear mixed with a Silverson mixer until a smooth ink suitable for printing was produced. The total organic composition of this ink was 0.66% by weight. The ink was screen printed through an appropriately selected screen mesh over the top of the first layer to give a nominal platinum black loading on the electrode of 4.0 mg cm$^{-2}$ geometric area. The part complete electrode was fired at 385° C. in an air atmosphere.

A third layer was applied to the catalyst layer to complete the electrode preparation. An aqueous solution of Nafion proton conducting polymer was produced as described in Example 2, to a concentration of 7.5 wt % Nafion in an essentially aqueous solution. This ink was screen printed through an appropriately selected screen mesh. The electrode manufacture was completed by drying as described in Example 1. The resulting electrode formed the cathode of an MEA. The anode was a state of the art electrode, as employed in current PEMFC stacks based on a high platinum loading of 4.0 mg cm$^{-2}$, using an unsupported platinum black catalyst.

By way of making a direct comparison, the performance was compared with that of an MEA in which the cathode was formulated with the same three layers, with the catalyst layer formulated to the comparable loading of the unsupported platinum black catalyst, but fabricated by the laboratory processing method, as currently practised in the art. The coating of Nafion solution onto the pre-formed gas diffusion electrode, to complete the preparation, was based on the solution comprising a high level of volatile organic solvents, typical of that described in the prior art. The Nafion EW 1100 solution (from Solution Technology Inc. of Mendenhall, Pa., U.S.A., and contained as a 5 wt % solution in an essentially organic solvent of approximately 77% lower aliphatic alcohols with approximately 18% water) was painted directly onto the electrode surface, whilst the electrode was maintained on a hot plate at a temperature of 70°–80° C.

Figure 3:
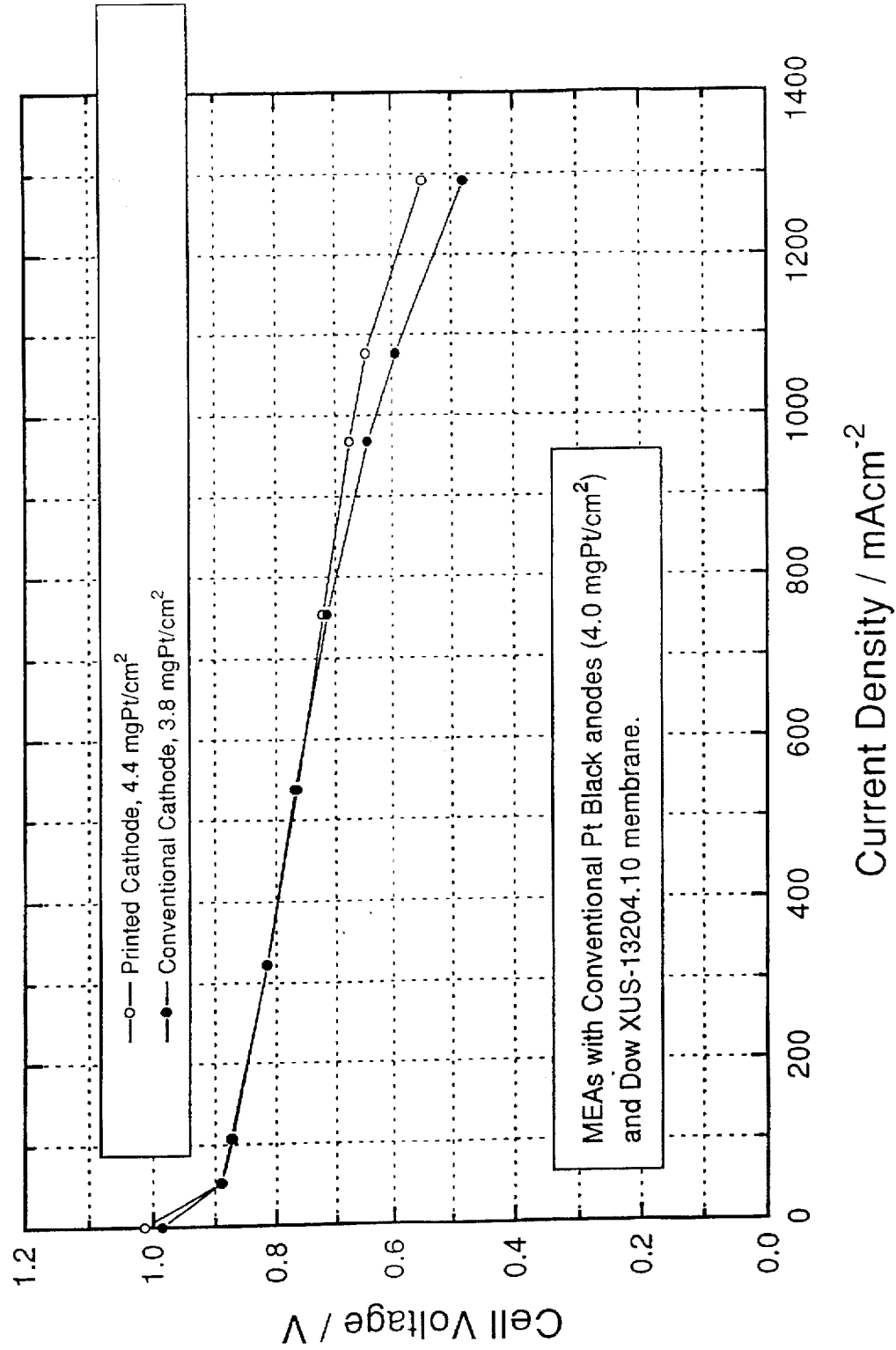

The performance of the MEAs are illustrated in FIG. 3. It is clear that the performance of the MEA comprising the high volume manufacturable cathode, in which all component layers have been printed from aqueous based inks, is similar to that of the comparative cathode fabricated using conventional inks. FIG. 3 does indicate, however, that at high current densities, the electrode of the invention does provide an improved performance. Typically, the PEMFC if employed in transportation applications will operate at high current densities to maximise power density (power output per unit volume). The electrode of the invention does show the potential for a 40 mV improvement in cell voltage at these current densities. This will provide increased power density and increased efficiency of operation.

EXAMPLE 4

In this embodiment of the invention the advantage of producing an electrode comprising several layers, by a low cost, volume manufacturable technology, based on essentially aqueous inks suitable for printing, is again demonstrated, but using a carbon supported platinum catalyst layer to provide a lower cost, lower platinum loading cathode compared to that of Example 3.

A first layer comprising carbon black and PTFE polymer was printed in a similar manner to that described in Example 3. The second layer, comprising an essentially aqueous ink comprising carbon supported catalyst and PTFE was prepared by adding demineralised water (1.000 cm$^3$) to a carbon supported catalyst (250 g of a 40 wt % platinum catalyst, supported on Cabot Vulcan XC72R, from Johnson Matthey Inc., New Jersey, U.S.A.). The mixture was stirred, whilst heating to 40° C., until the catalyst was thoroughly wetted. PTFE solution was added (15.65 g of ICI GP1 60 wt % solids suspension). The slurry was heated to 60° C. with continuous stirring until the mixture gelled. After cooling this was filtered to remove excess water. To the resulting gel (typically weighing 900 g) was added a solution (645 g as a 2 wt % aqueous solution) of methyl cellulose (from Aldrich Chemical Company, Dorset, UK). The mixture was shear mixed with a Silverson mixer until a smooth ink suitable for printing was produced. The total organic composition of this ink was 0.84% by weight. The ink was screen printed through an appropriately selected screen mesh over the first layer to give a platinum loading on the electrode of 0.41 mg cm$^{-2}$ geometric area. The part complete electrode was fired at 385° C. in an air atmosphere.

A third layer of an aqueous solution of Nafion proton conducting polymer was applied to the catalyst layer as described in Example 3, with the exception that a solution concentration of 9.5 wt % Nafion in an essentially aqueous solution was screen printed through an appropriately selected screen mesh. The electrode manufacture was completed by drying as described in Example 1. The resulting electrode formed the cathode of an MEA. The anode was an electrode of the present invention, as described in Example 1, comprising a printed electrode manufactured from an aqueous ink, with a platinum loading of 0.25 mg cm$^{-2}$.

By way of making a direct comparison, the performance was compared with that of an MEA in which the cathode was formulated with the same three layers, with the catalyst layer formulated to a platinum loading of 0.34 mg cm$^{-2}$ of the same carbon supported platinum catalyst, but fabricated by the laboratory processing method, as currently practised in the art. The coating of Nafion solution onto the pre-formed gas diffusion electrode, to complete the preparation, was based on the solution comprising a high level of volatile organic solvents and using the procedure as described in Example 3.

Figure 4:
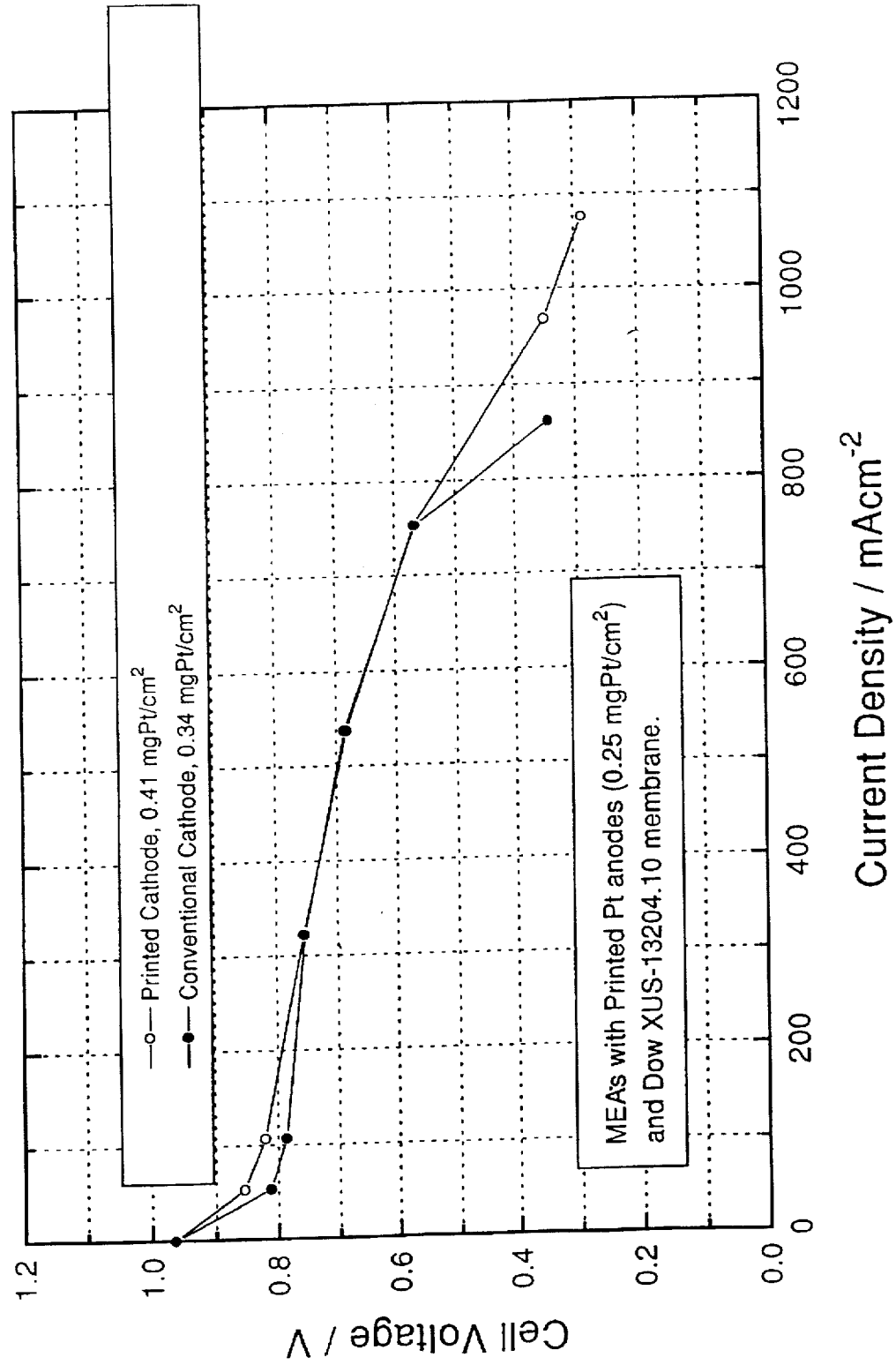

The performance of the MEAs are illustrated in FIG. 4. In this example the cathodes are similar to those in Example 3, except that carbon supported catalysts have been employed to provide lower platinum loading cathodes. In addition, the anodes employed in both MEAs are those of the invention as described in Example 1. The performance of the MEA comprising the high volume manufacturable cathode, in which all component layers have been printed from aqueous based inks, is similar to that of the comparative cathode fabricated using conventional inks. FIG. 4 does indicate, however, that at high current densities, the electrode of the invention does again provide improved performance. It is also of importance to realize that the MEA comprising both printed anode and printed cathode, derived from aqueous inks, demonstrates that acceptable cell performances can be achieved from MEAs in which low platinum loading electrodes are manufactured via processes which are amenable to high volume, low cost production.

EXAMPLE 5

Figure 5:
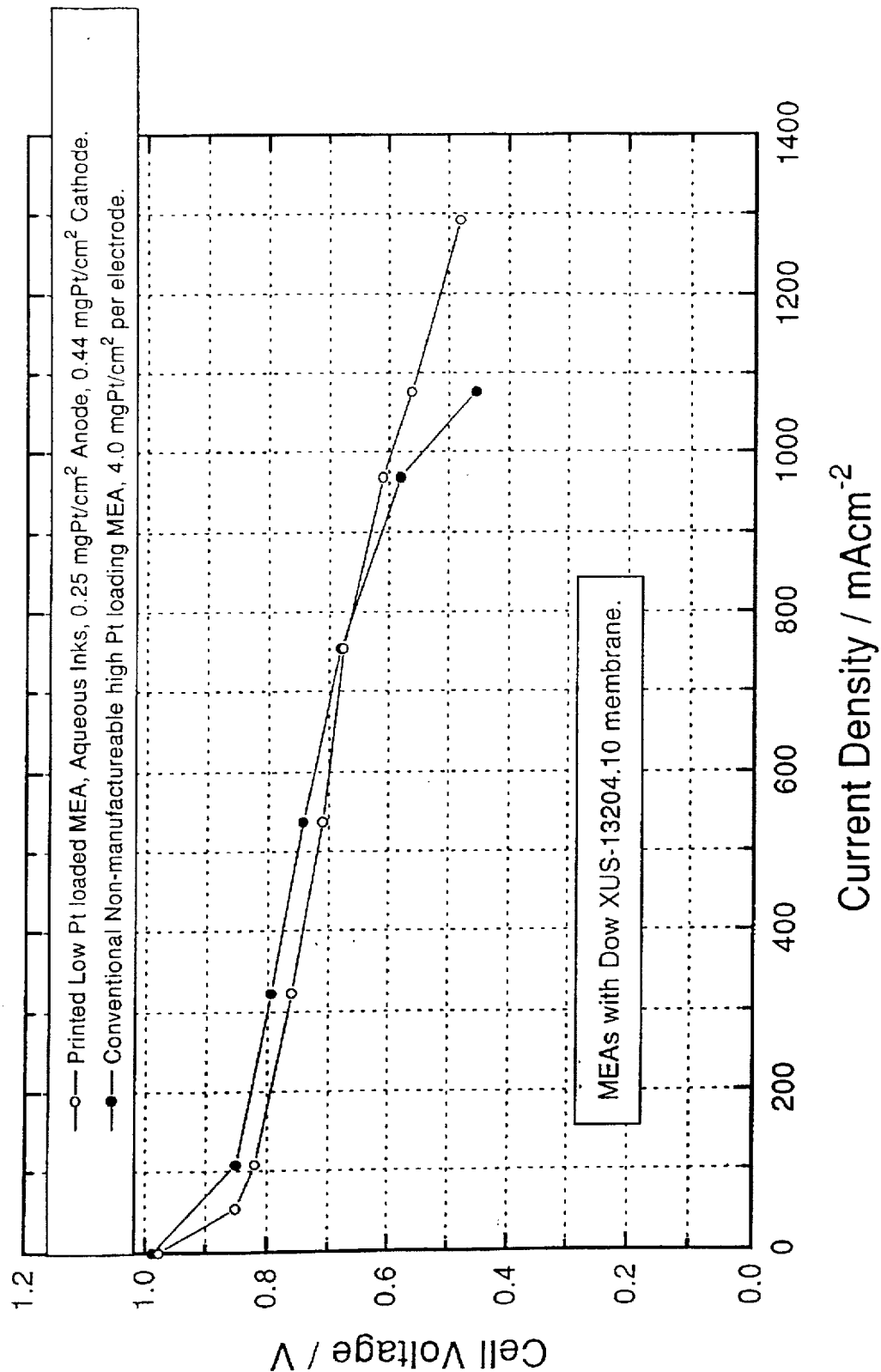

In this embodiment of the invention, an anode of the invention, typically as described in Example 1, and a cathode, typically as described in Example 2, were combined with the membrane electrolyte to form an MEA with a low total platinum loading of 0.71 mg cm$^{-2}$. The performance, as illustrated in FIG. 5, is compared with that of a conventional MEA employing high platinum loading electrodes, fabricated by laboratory methods, as currently employed for pre-commercial PEMFCs. The MEA of the invention, is made from electrodes both of which are printed from essentially aqueous inks comprising catalyst and Nafion proton conducting polymer, and has a greater than tenfold total platinum loading reduction compared with currently employed MEA technology. The MEA of the invention shows improved performance at high current density

We claim:

1. An ink comprising a mixture of one or more catalyst materials and one or more proton-conducting polymers in a liquid medium, wherein said liquid medium is aqueous-based and essentially free from organic components.

2. An ink according to claim 1 wherein the proton-conducting polymer is a fluorinated co-polymer with ion exchange groups.

3. An ink according to claim 1 wherein the one or more catalyst materials are selected from the platinum group metals, gold, silver or a base metal or base metal oxide, or an alloy comprising one or more of these metals.

4. A process for preparing an ink according to claim 1, said process comprising mixing the one or more catalysts with the one or more proton-conducting polymers in a liquid medium, which may be aqueous or organic, and thereafter transforming any organic medium into an essentially aqueous medium.

5. A electrode comprising an ink according to claim 1.

6. A membrane electrode assembly comprising an electrode according to claim 5.

7. A fuel cell comprising a membrane electrode assembly according to claim 6.

8. A membrane electrode assembly comprising an ink according to any one of claim 1.

9. A process for preparing a membrane electrode assembly comprising applying an ink according to claim 1 directly onto the surface of a polymer electrolyte membrane.

10. A fuel cell comprising a membrane electrode assembly according to claim 8.

11. A printing ink comprising one or more catalysts and one or more polymer materials in a liquid medium characterised in that the liquid medium is aqueous-based and comprises less than 10% by weight organic components.

12. A printing ink according to claim 11 wherein the one or more polymer materials is selected from a proton-conducting polymer or an organic polymer which acts as an electrode structural binder and/or controller of reactant and product flow through the electrode.

13. An electrode comprising a printing ink according to claim 11.

14. A process for preparing an electrode comprising applying a printing ink according to claim 11 to a substrate by a printing method.

15. An membrane electrode assembly comprising a printing ink according to any one of claim 11.

16. A process for preparing an membrane electrode assembly comprising applying a printing ink according to claim 11 directly onto the surface of a polymer electrolyte membrane by a printing method.

17. An electrode prepared by printing an ink comprising one or more catalysts and one or more organic polymers which act as structural binders and/or controller of reactant and product flow onto a substrate followed by applying a layer of an aqueous solution of a proton-conducting polymer.

* * * * *